US011921889B2

(12) United States Patent
Llamas Virgen et al.

(10) Patent No.: US 11,921,889 B2
(45) Date of Patent: Mar. 5, 2024

(54) SELECTIVE DISPLAY OF SENSITIVE DATA

(71) Applicant: International Business Machines Corporation, Armonk, NY (US)

(72) Inventors: Paul Llamas Virgen, Zapopan (MX); Carolina Garcia Delgado, Zapopan (MX); Vladimir Garcia Saavedra, Tlaquepaque (MX); Humberto Orozco Cervantes, Tonala (MX)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 17/068,991

(22) Filed: Oct. 13, 2020

(65) Prior Publication Data

US 2022/0114281 A1 Apr. 14, 2022

(51) Int. Cl.
| | |
|---|---|
| *G06N 20/00* | (2019.01) |
| *G06F 16/36* | (2019.01) |
| *G06F 18/243* | (2023.01) |
| *G06F 21/62* | (2013.01) |
| *G06N 5/01* | (2023.01) |

(52) U.S. Cl.
CPC .......... *G06F 21/6254* (2013.01); *G06N 5/01* (2023.01)

(58) Field of Classification Search
CPC ............. G06F 21/6254; G06F 21/6245; G06F 16/374; G06F 21/62; G06N 5/003; G06N 20/00; G06K 9/6282
See application file for complete search history.

(56) References Cited

U.S. PATENT DOCUMENTS

| | | |
|---|---|---|
| 8,245,125 B1 | 8/2012 | Pupius |
| 8,346,532 B2 | 1/2013 | Chakra |
| 8,490,157 B2 | 7/2013 | Thompson |
| 8,644,479 B2 | 2/2014 | Goguen |
| 9,032,028 B2 | 5/2015 | Scott |
| 9,219,735 B2 | 12/2015 | Hoard |

(Continued)

FOREIGN PATENT DOCUMENTS

| | | |
|---|---|---|
| CN | 1871856 A | 11/2006 |
| CN | 111711794 A | 9/2020 |

(Continued)

OTHER PUBLICATIONS

"DeveloperForce", retrieved from the Internet on Aug. 25, 2020, 1 page, <https://developer.salesforce.com/forums/?id=906F000000097HGIAY>.

(Continued)

*Primary Examiner* — J. Brant Murphy
*Assistant Examiner* — Aayush Aryal
(74) *Attorney, Agent, or Firm* — David K. Mattheis

(57) ABSTRACT

Selectively presenting information by generating a dictionary including information categorized as sensitive according to a participant's characteristic, generating a display matrix including display rules according to the participant's characteristics, detecting sensitive data in a presentation stream, determining display coordinates for the sensitive data, determining a presentation status for the sensitive data according to the participant's characteristics, the dictionary, the decision tree and the display matrix, and masking the presentation of the sensitive information according to the presentation status and the display coordinates.

20 Claims, 5 Drawing Sheets

(56) References Cited

U.S. PATENT DOCUMENTS

| 9,489,515 | B2 | 11/2016 | Yermakov | |
|---|---|---|---|---|
| 9,703,983 | B2 | 7/2017 | Eisen | |
| 2011/0270922 | A1 | 11/2011 | Jones | |
| 2014/0150114 | A1* | 5/2014 | Sinha | G06F 21/62 |
| | | | | 726/28 |
| 2016/0019410 | A1 | 1/2016 | Komogortsev | |
| 2017/0040002 | A1* | 2/2017 | Basson | G09G 5/373 |
| 2018/0293403 | A1* | 10/2018 | Cheng | H04L 9/0643 |
| 2020/0201958 | A1* | 6/2020 | Chen | G06Q 10/10 |

FOREIGN PATENT DOCUMENTS

| DE | 102021123133 | A1 | 4/2022 |
|---|---|---|---|
| GB | 2600819 | B | 12/2022 |
| JP | 2015215758 | A | 12/2015 |
| JP | 2022064311 | A | 4/2022 |
| RU | 2602985 | C2 | 11/2016 |
| WO | 2015172521 | A1 | 11/2015 |
| WO | 2016090376 | A1 | 6/2016 |

OTHER PUBLICATIONS

Authors et. al.: Disclosed Anonymously, "Contextual Split screen sharing method in online web conferencing", An IP.com Prior Art Database Technical Disclosure, IP.com No. IPCOM000262834D, IP.com Electronic Publication Date: Jul. 6, 2020, 4 pages.

Authors et. al.: Disclosed Anonymously, "Method for easing the sharing of document with sensitive content in a video conference", An IP.com Prior Art Database Technical Disclosure, IP.com No. IPCOM000261292D IP.com Electronic Publication Date: Feb. 18, 2020, 4 pages.

Authors et. al.: Disclosed Anonymously, "Role-Based Mapping Rules Blur All or Parts of Shared Content Based on Cognitive Analysis", An IP.com Prior Art Database Technical Disclosure, IP.com No. IPCOM000262057D, IP.com Electronic Publication Date: Apr. 28, 2020, 3 pages.

Costello et al., "Enhanced Privacy for Video Meetings", An IP.com Prior Art Database Technical Disclosure, IP.com No. IPCOM000253269D, IP.com Electronic Publication Date: Mar. 19, 2018, Copyright: Copyright 2018 Cisco Systems, Inc., 7 pages.

Mell et al., "The NIST Definition of Cloud Computing", Recommendations of the National Institute of Standards and Technology, Special Publication 800-145, Sep. 2011, 7 pages.

Unadkat, Jash, "Understanding the Role of Rendering Engine in Browsers", BrowserStack, Nov. 15, 2019, 6 pages.

Combined Search Report and Exam Report dated Mar. 8, 2022 from GB Application No. GB2113826.8.

* cited by examiner

SELECTIVE DISPLAY OF SENSITIVE DATA

BACKGROUND

The disclosure relates generally to the selective display of sensitive data. The disclosure relates particularly to selectively displaying data according to viewer characteristics.

Virtual conferences have increased exponentially during the last years. Such conferences are used for a variety of purposes and also mitigate the distribution and separation of conference attendees. Conferences typically include the display of a common set of information during a session to all session attendees. Each user enjoys complete access to all displayed content.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the automatic selection and masking of presentation information according to the presentation content and a viewer's characteristics.

Aspects of the invention disclose methods, systems and computer readable media associated with selectively presenting information by generating a dictionary including information categorized as sensitive according to a participant's characteristic, generating a display matrix including display rules according to the participant's characteristics, detecting sensitive data in a presentation stream, determining display coordinates for the sensitive data, determining a presentation status for the sensitive data according to the participant's characteristics, the dictionary, the decision tree and the display matrix, and masking the presentation of the sensitive information according to the presentation status and the display coordinates.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
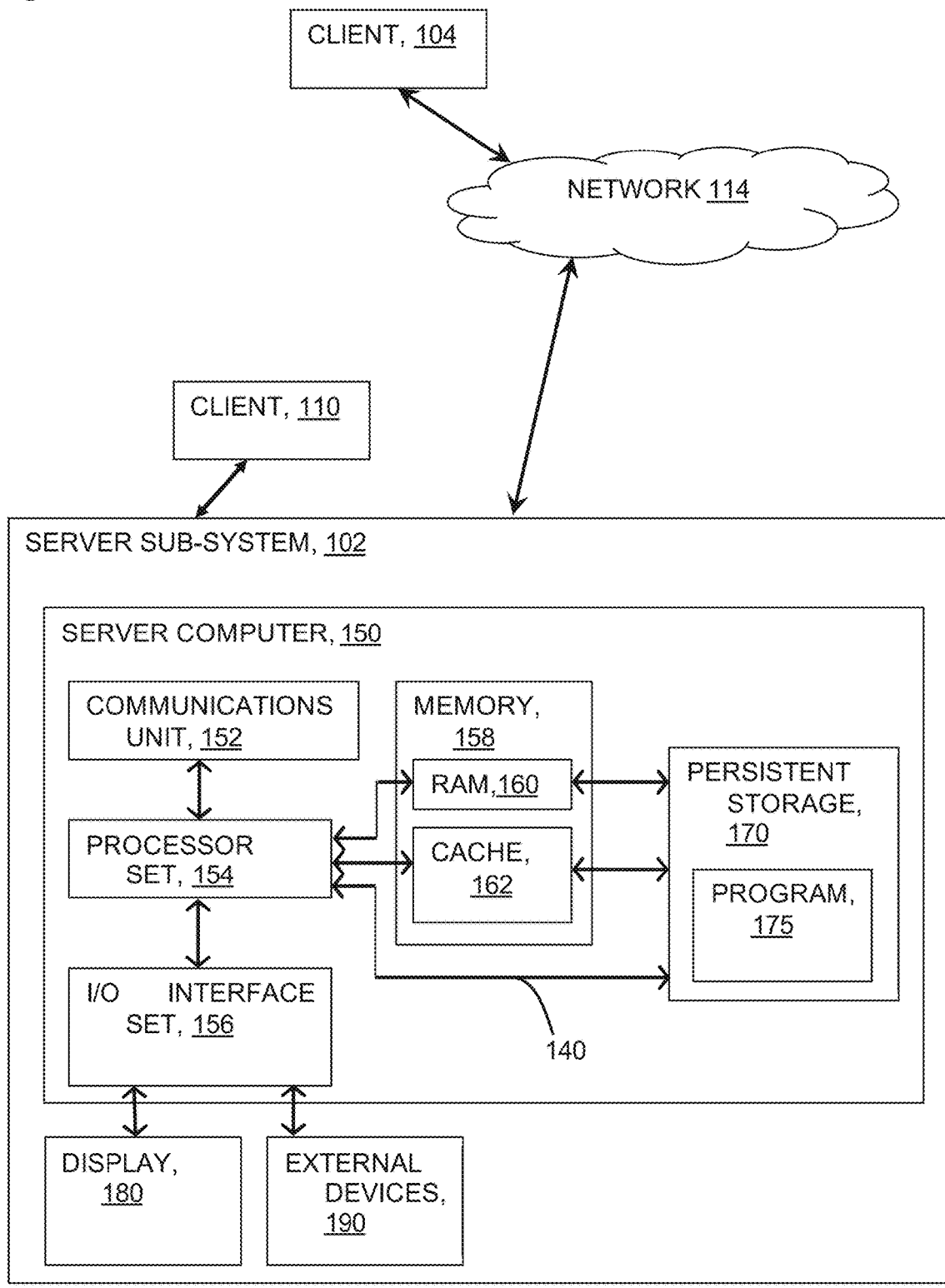
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

A remote conference for presenting information may include a project manager, software developers working on the project, and a financial analyst associated with the project. Portions of a shared presentation are relevant to all participants. Project financial data, including developer compensation amounts, may be considered sensitive information. Disclosed embodiments enable selective presentation of information according to the information content and the characteristics of the viewer. For the example, disclosed embodiments enable the sharing and discussion of the financial data between the project manager and the financial analyst while masking that data and discussion from the view of the developers. Disclosed embodiments dynamically detect and present sensitive data according to participant characteristics.

In an embodiment, one or more components of the system can employ hardware and/or software to solve problems that are highly technical in nature (e.g., generating a dictionary including information categorized as sensitive according to a participant characteristic, generating a decision tree for a communications channel according to the participant's behavior, generating a display matrix including display rules according to the participant's characteristics and the decision tree, detecting sensitive data in a presentation stream, determining display coordinates for the sensitive data, determining a presentation status for the sensitive data according to the participant's characteristics, the dictionary, the decision tree and the display matrix, masking the presentation of the sensitive information according to the presentation status and the display coordinates, etc.). These solutions are not abstract and cannot be performed as a set of mental acts by a human due to the processing capabilities needed to facilitate selective content masking, for example. Further, some of the processes performed may be performed by a specialized computer for carrying out defined tasks related to presenting content. For example, a specialized computer can be employed to carry out tasks related to selectively masking or presenting sensitive content according to the characteristics of a viewer, or the like.

In an embodiment, the method generates and maintains a dictionary of sensitive terms. The method generates the dictionary using user provided input identifying sensitive terms. The input may be provided directly by a user or may be gleaned by the method from previous interactions with user presentations in which terms were identified as sensitive. The method updates the dictionary adding sensitive information entries associated with terms identified by presenters in content for planned presentations. The dictionary entries include the term and viewing permission limits relating to company limits as well as job role limits. As an example, the dictionary entry for "cost" includes a limit on viewing to "Company A" employees and a limit on job roles to "Project Manager", "Manager", and Financial Analyst".

In an embodiment, the method generates a decision tree for each participant. In this embodiment, each participant decision tree includes branches associated with different communications channels used by the participant. In this embodiment, each participant agrees, or "opts in" to the review and analysis of communications including emails, phone calls—using a speech to text conversion algorithm, chat messages, and other communications. The decision tree review focuses on validating the job role of the participant within the company. In an embodiment, the decision tree review further validates access by the participant to information of different types.

In an embodiment, the method generates a display matrix utilizing the dictionary entries and decision tree analysis outputs. The display matrix catalogs and cross-references individual participants in validated job roles having validated access to particular types of information designated as sensitive by a dictionary entry. The display matrix includes the display rules for different types of information designated as sensitive according to the dictionary. The rules relate to which job types, or individuals, or company employees, may view the different types of sensitive information, and which job roles, individuals in job roles, and company employees, may not view each different type of sensitive information. In an embodiment, matrix entries for a particular meeting include fields for: the source of the information regarding the meeting such as the meeting host, each participant, the meeting topic, presentation zone(s) including sensitive information, participant's company's name, participant's job role, and the results of a presentation zone view.

In an embodiment, the method receives a planned presentation including sensitive information. The method scans the content of the presentation, such as a deck of presentation slides. In this embodiment, the method divides each presentation slide into quadrants or zones, e.g., quadrants A, B, C, and D. For each quadrant of each slide, the method then defines positive angles, starting at 0 and ending at 359, the positive angles encompassing the entirety of the quadrant. The method scans each quadrant for sensitive information text. The method tracks the quadrant and angle for any sensitive information text found. For example, the method identifies the word "cost", designated as sensitive in the dictionary, between 270 and 359 degrees, in quadrant, or zone C, of slide 10 of a presentation deck. From the matrix entries for the associated meeting, the method determines company—job role combinations which lack the necessary permissions to view the identified sensitive information. The method finds that three participants appear to match the company-job role combination identified. For each identified participant, the method generates, or revisits a previously generated, decision tree for the participant. The method reviews available emails, calls, and chats including the participant to validate the tentative indication of company-job role. For participants validated in terms of the company—job role match, the method determines that at least that portion of slide 10 related to cost must be masked from view for the designated participants lacking the necessary permissions. In this embodiment, the method masks at least 270-359 degrees of zone C of slide 10 for the three identifies participants during the presentation.

Table 1 provides a view of representative matrix entries for a planned meeting/presentation.

TABLE 1

| Source | Meeting topic | Sensitive zone | Company | Job Role | Zone view results | | | |
|---|---|---|---|---|---|---|---|---|
| Host | New software | Cost, Zone C, slide 10 | A | Developer | A | B | C̄ | D |
| Host | | | B | Developer | A | B | C̄ | D |
| Host | A release | | B | Developer | A | B | C̄ | D |
| Host | | | B | Manager | A | B | C̄ | D |

As indicated by the table, the three developer participants lack permission to view sensitive cost information detected on slide 10 in quadrant C. During the presentation the method will mask this cost information from the three developers and present it to the manager.

For audio associated with sensitive information, the method uses a speech to text algorithm and scans the converted text output for sensitive information. The method mutes audio based upon inclusion of sensitive information after reviewing the relevant matrix entries, performing the decision tree analysis for the identified users of concern and validating that one or more users lack permission to hear the sensitive audio portion of the presentation.

The method retains the matrix entries for each meeting and refers to past meeting entries for determining rules associated with content viewing for future presentations of similar information types. For example, a review of past entries indicates that Company A employees are barred from viewing source code information. The method reviews dictionary entries associated with source code and ensures that the entries accurately reflect a lack of viewing permission for employees of Company A. For future meetings, the method scans the presentation information and notes source code related portions of the presentation in terms of the location of the information—slide number, zone, and zone portion. The method then generates matrix entries for the future meeting relating to the need to mask the source code portions from viewing by Company A employees. The method reviews company information for the participants scheduled for the future meeting. For any participants appearing to work for Company A, the method utilizes a decision tree to scan available communications to validate employment at Company A. The method then masks the information from viewing by the Company A employees using obfuscating pixelization of the information, by completely removing the quadrant of the slide(s) from view or covering the relevant slide portion with an obscuring coloration or blurring effect.

In an embodiment, the method may alter dictionary and matrix entries according to user input, such as a meeting host making exceptions regarding the presentation of sensitive information to particular job roles or particular companies normally excluded from viewing the sensitive information.

In an embodiment, a web conference system starts a session, providing the user's session content and the corresponding data matching data base or dictionary that contains the Sensitive Data by specific roles. The system loads the method/mechanism API (application program interface) that includes the library and references to integrate the application sharing information. The method detects the specific sharing application, using known scripting (depending upon the programming language), using corresponding APIs and libraries to access the application's elements such as TEXT, Images, Objects, etc. The method initiates the matching data process to detect the Sensitive Data on the sharing applications, defined on the data matching DB or dictionary. As described above, the method determines the specific display coordinates for the Sensitive Data: Coordinates for Text, Images, Objects, etc. within the presentation slides. The method then disables the presentation/masks/hides the Sensitive Information data on specific Application's Coordinates (Such as XX, YY, ZZ) for specific viewers associated with defined Companies and/or job roles.

In an embodiment, the method takes known steps to capture a recording of the presentation. For a recorded version of the presentation, the method conducts the analysis described above during the recording of the information for the participants identified by the meeting host. The method then associates metadata with the recording. The metadata provides the details necessary to mask/present the sensitive and non-sensitive portions of the presentation depending upon which participant views the recording. In this embodiment, the method receives the participant's profile information prior to replaying the recording and uses the metadata to appropriately mask sensitive data and audio from the participant during the playback of the recording. For example, a conference restricts the developer member from viewing financial information, and the recording contains metadata indicating the co-relationship between the sensitive financial information and the developer. When the method sends the recording to the developer, it will associate the metadata with the developer's profile to download the recording and will inject the necessary rules so that in this case, the financial information is hidden (text, image, voice, etc.), from the developer at the time of the reproduction/visualization.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise a selective presentation program (not shown) together with sufficient computing resource (processor, memory, network communications hardware) to execute the program. In an embodiment, client device 104 and 110 represent presentation participant devices, either meeting hosts or presentation viewers. The host and viewers connect over a network to share the presentation content under the viewing management of the disclosed selective presentation program executing upon the client devices as well as the server subsystem computer(s)

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the selective presentation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., selective presentation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
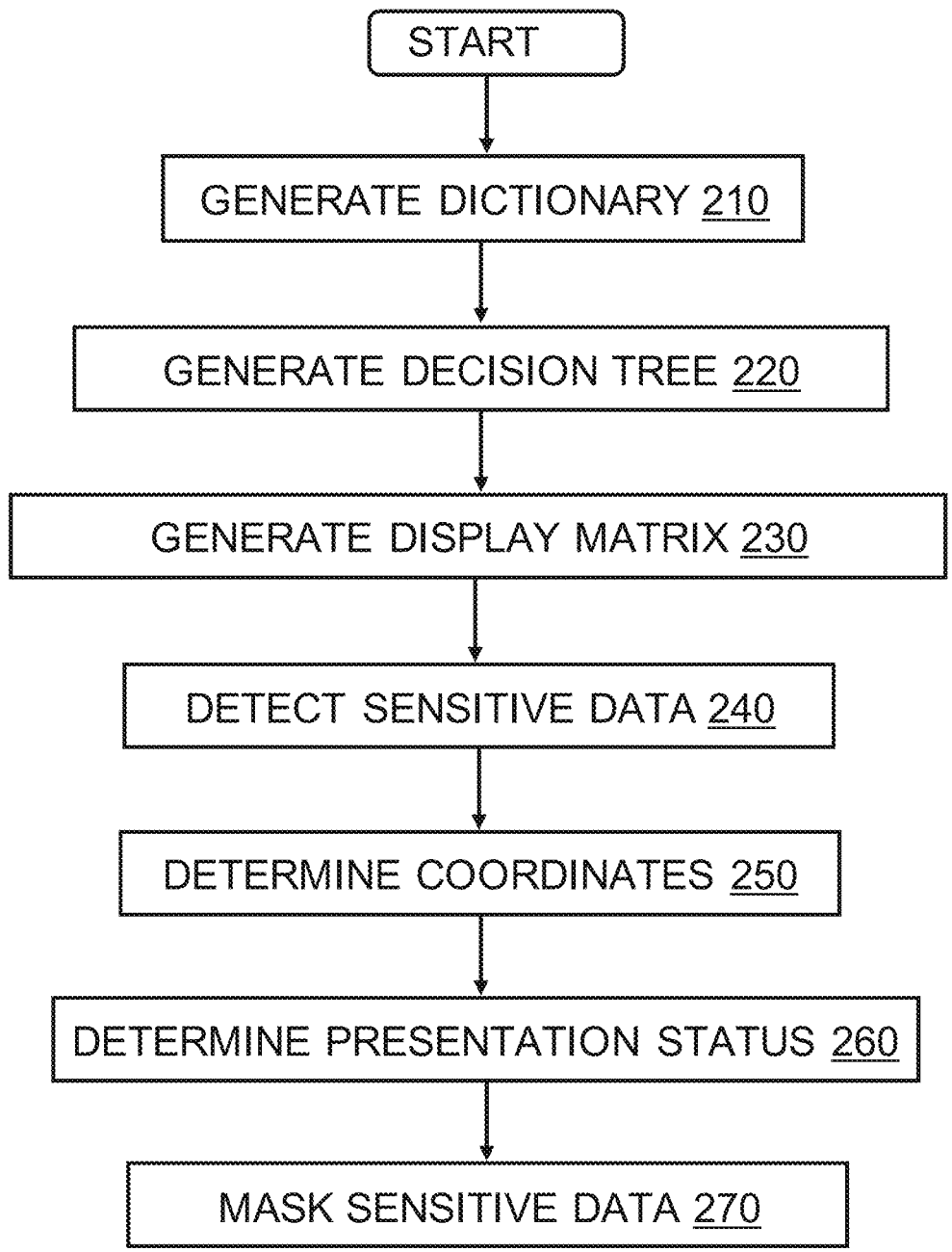
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of selective presentation program 175 generates a dictionary of sensitive information. The dictionary includes sensitive terms and parameters associated with the terms defining the limits of the sensitivity or defining the characteristics of viewers who may see the information as well as those viewers who may not see the information. The sensitive information may be defined by a meeting host, or by other user input. The user defining the information as sensitive may further provide the viewer characteristics defining the sensitivity limits. The dictionary of sensitive information is cumulative in nature. Over time, the method adds information designated as sensitive for any given presentation to the dictionary together with the defining viewer characteristics associated with the information. In an embodiment, the method receives presentation content data associated with a planned presentation and scans the data for sensitive data according to the dictionary entries.

At block 220, the method of selective presentation program 175 generates a decision tree for each presentation participant identified from a matrix of data entries associated with a presentation. The decision tree analyzes communications from and to potential presentation participants identified by a meeting host or otherwise present in a display matrix entry. The method analyzes the communications traffic across a plurality of communications channels, including emails, phone calls, VOIP calls, and chats, to validate the participant in terms of the participant's company affiliation, job role, and/or other participant characteristics. The decision tree analysis considers the text of emails and chats as well as the textual transcript of any voice calls, the calls converted to text using a speech to text algorithm.

At block 230, the method of selective presentation program 175 generates a display matrix. Display matrix generation may begin with entries provided by a meeting host. The initial entries may include the host's identification, the meeting topic, and participant characteristic information such as names, company affiliation, and job role of each participant. The entries may further include sensitive content information relevant to the planned presentation. The method builds upon the initial matrix entries by adding participant characteristic validation data obtained from the participant's decision tree analysis. The method builds the entries to include one or more rules relating the presentation of the sensitive information and the scheduled participants' characteristics. These relationships may be defined by the host, the presenter of sensitive information, or derived from matrix entries associated with past meeting having similar topics, including similar sensitive information, or similar participants.

After scanning the planned presentation content files for keywords from the view of the sensitive information dictionary, at block 240 the method of the selective presentation program 175 detects sensitive information in the content files for the presentation.

At block 250 the method determines the display coordinates for the detected sensitive information. In an embodiment, the method divides presentation slides into quadrants or zones. The method then defines a unit circle for each zone and scans the zone for sensitive information terms. The method localizes the sensitive information in terms of the relevant portion of the unit circle within the zone. For example, the method detects the use of the sensitive term "cost" between 300 and 360 degrees of the unit circle of zone C, of slide 10, of the presentation. The method adds the detected sensitive information and associated display coordinates to the relevant display matrix entries. As an example, the method adds the presence of cost information between 300 and 360 degrees of zone C of slide 10 to the entries of the planned presentation and analyzes the permissions of the scheduled participants according to the dictionary entry for cost information. The method considers each participants' characteristics and validates those characteristics using current and past decision tree analysis of the participant's communications.

At block 260, after validating participant permissions according to the dictionary entries, the decision tree analysis and the display matrix rules, the method determines a display status for the detected sensitive information. The method adds the determined display status to the display matrix entries for the scheduled participants of the planned presentation. For example, a scheduled participant worked for Company A as a developer. The method determines that cost data is not shared with Company A or with developers. The method validates the participant's company and job role using decision tree analysis of their communications. The method determines a display status of "mask" for this participant and the cost information. The method adds the display status "mask" to the entries associated with this presentation, the cost data and the Company A developer.

At block 270, the method masks the sensitive data during the actual presentation. For the example, the method obfuscates or completely removes at least the data displayed between 300 and 360 degrees in zone C of slide 10 from the view of the content provided to the Company A developer, as well as from the view of any other participant indicated by the entries of the display matrix. In an embodiment, the method obfuscates the sensitive data by altering the pixel resolution of the identified portion of the display, increasing the pixel size for that portion and rendering the portion unreadable. In an embodiment, the method obfuscates the sensitive data portion by blurring all relevant pixels to a uniform color—such as gray, black, or other color, creating the appearance that the sensitive data has been redacted from the presentation, again rendering the sensitive data portion unreadable.

Figure 3:
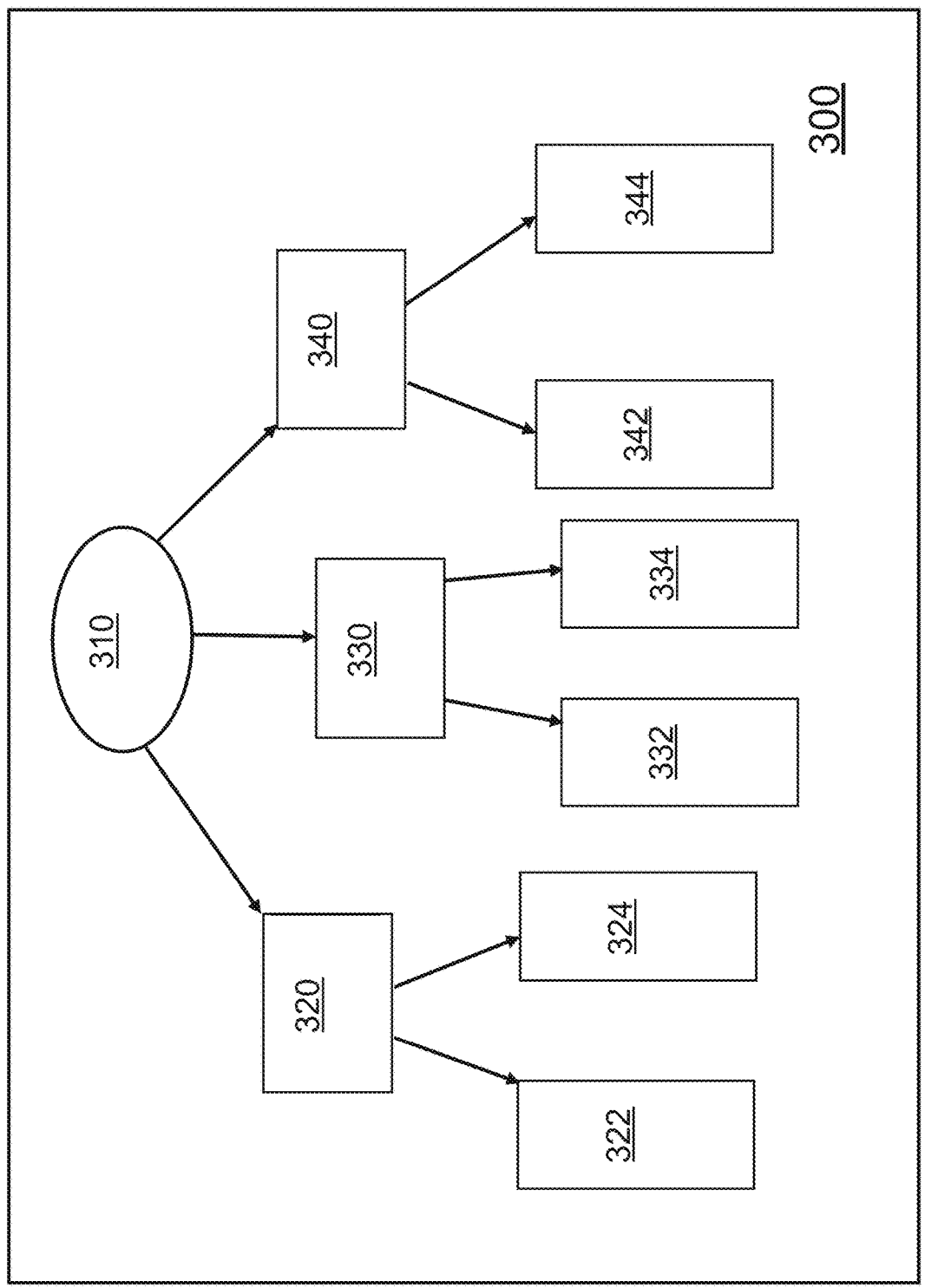
FIG. 3 depicts a participant decision tree, according to an embodiment of the invention.

FIG. 3 provides a schematic illustration 300 of a participant decision tree, according to an embodiment of the invention. As shown in the Figure, a participant 310 has three communications channels, email, calls, and chats, which are analyzed by the disclosed methods. The methods review the text of emails 320, and chats 340, as well as speech to text transcripts of calls 330. Each review of the analysis either validates, 322, 332, and 342, the characteristics of the participant 310, or invalidates those characteristics 324, 334, and 344. Validation includes the detection of text in the communications similar or identical to the company name and/or job role associated with the participant's characteristics. The absence of such similar or identical terms in the communications stream invalidates the participant's characteristics. The decision tree analysis outputs are added to display matrix entries for the participant. For invalid characteristics, the method generates display matrix entries indicating the invalidation and in an embodiment, flags all presentation content for masking for the participant having invalid characteristics.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
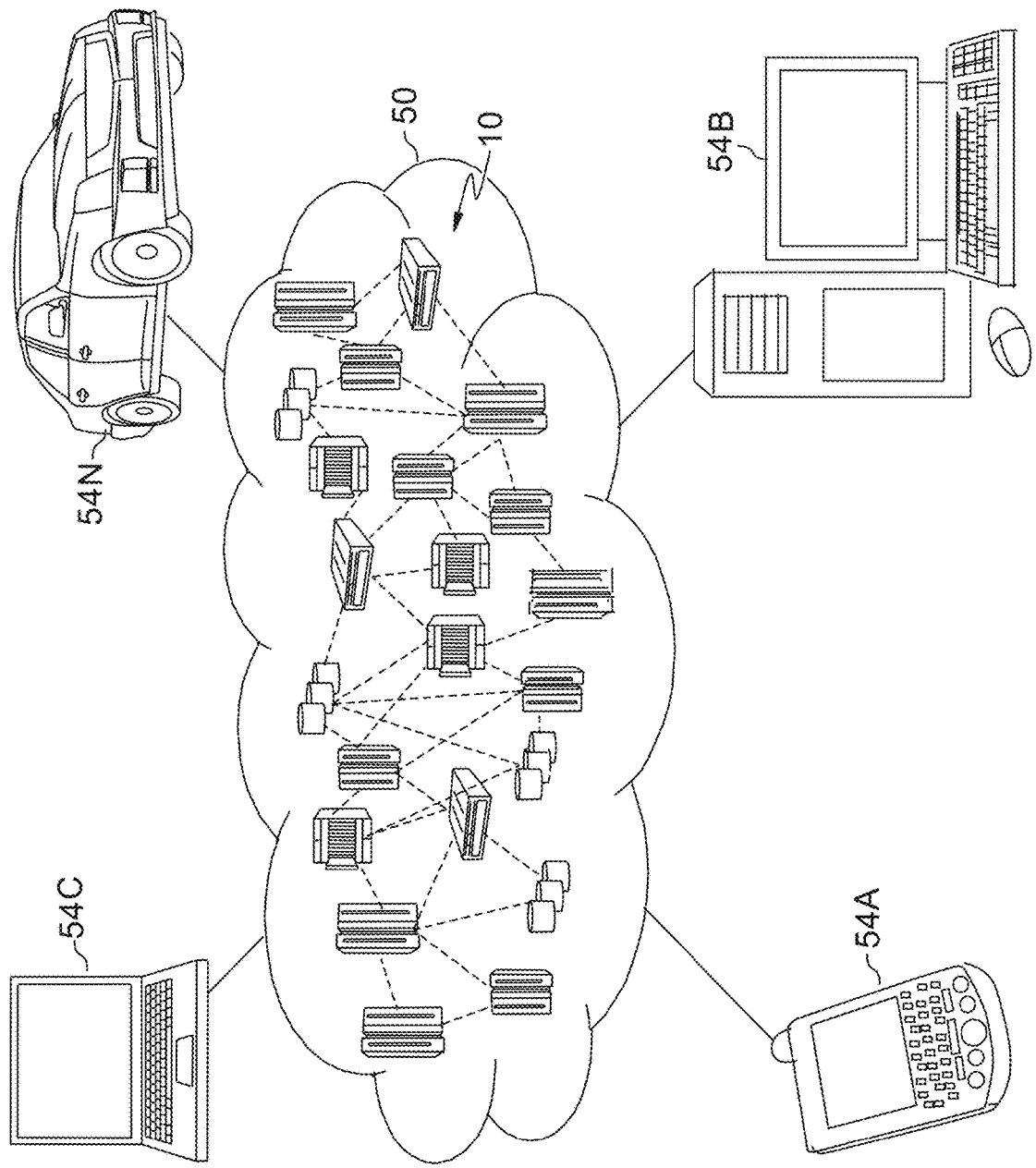
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
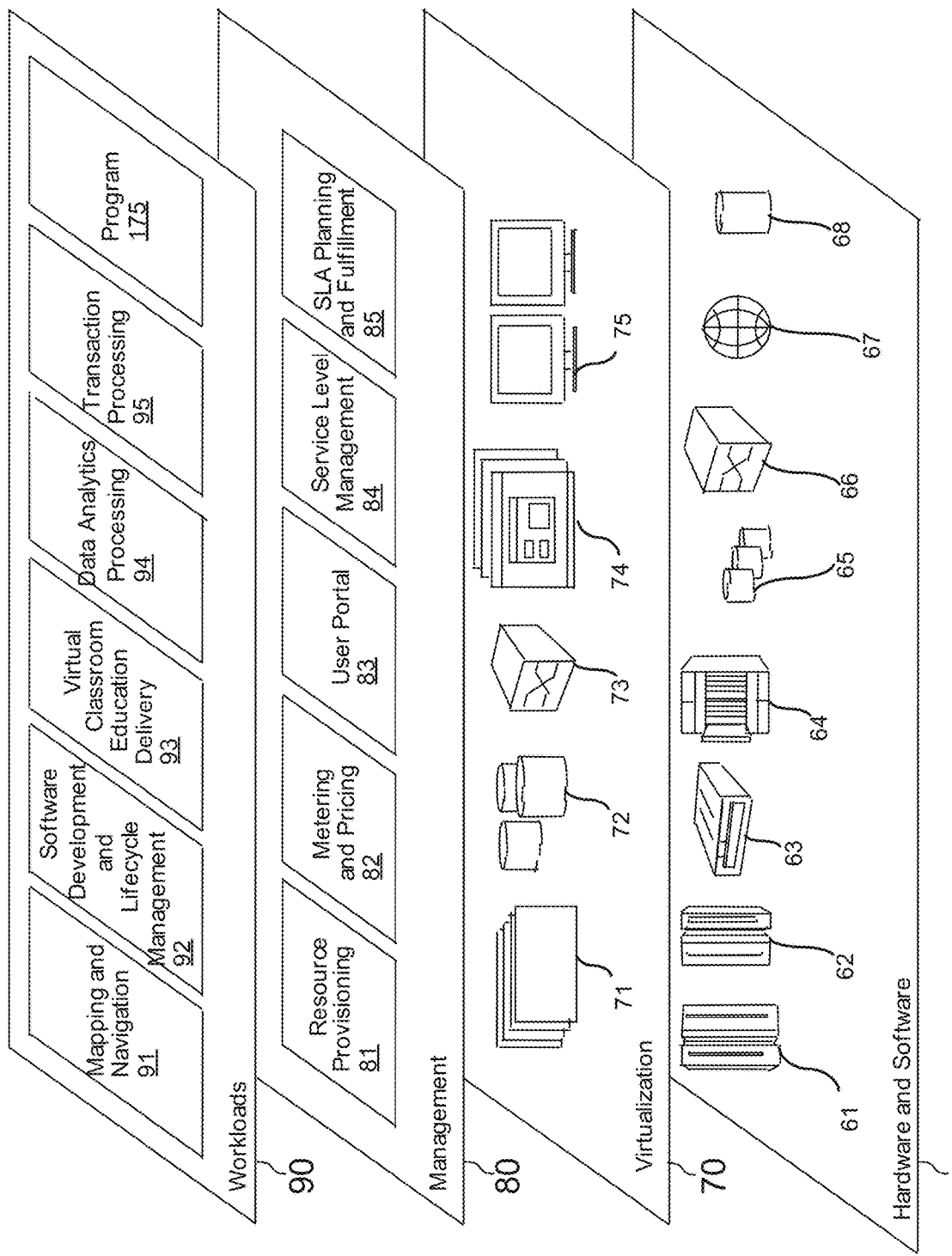
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective presentation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for selectively presenting information, the method comprising:
   generating, by one or more computer processors, a dictionary, the dictionary comprising information categorized as sensitive using participant provided input, and viewing permission limits for the information according to a participant's characteristics including at least one participant characteristic selected from a group consisting of: name, company affiliation and job role;
   generating, by the one or more computer processors, a display matrix including display rules according to the participant's characteristics;
   detecting, by the one or more computer processors, sensitive data in a presentation stream according to the dictionary;
   determining, by the one or more computer processors, display coordinates for the sensitive data;
   determining, by the one or more computer processors, a presentation status for the sensitive data according to the participant's characteristics, the dictionary, and the display matrix; and
   masking, by the one or more computer processors, the presentation of the sensitive data according to the presentation status and the display coordinates.

2. The computer implemented method according to claim 1, wherein the participant's characteristics comprise participant work role.

3. The computer implemented method according to claim 1, further comprising:
   generating, by the one or more computer processors, a decision tree for a communications channel according to the participant's behavior, wherein the decision tree comprises communications from a communications channel; and
   generating the display matrix including display rules according to a participant's characteristics and the decision tree.

4. The computer implemented method according to claim 1, further comprising masking, by the one or more computer processors, audio content associated with the sensitive data according to the presentation status.

5. The computer implemented method according to claim 1, wherein detecting sensitive information comprises scanning a file for keywords.

6. The computer implemented method according to claim 1, further comprising:
   recording, by the one or more computer processors, a presentation wherein the recorded presentation comprises presentation status metadata for a participant.

7. The computer implemented method according to claim 1, wherein the participant's characteristics comprise a past presentation status for sensitive information.

8. A computer program product for selectively presenting information, the computer program product comprising one or more computer readable storage devices and collectively stored program instructions on the one or more computer readable storage devices, the stored program instructions comprising:
   program instructions to generate a dictionary, the dictionary comprising information categorized as sensitive using participant provided input, and viewing permission limits for the information according to a participant's characteristics including at least one participant characteristic selected from a group consisting of: name, company affiliation and job role;
   program instructions to generate a display matrix including display rules according to the participant's characteristics;
   program instructions to detect sensitive data in a presentation stream according to the dictionary;
   program instructions to determine display coordinates for the sensitive data;
   program instructions to determine a presentation status for the sensitive data according to the participant's characteristics, the dictionary, and the display matrix; and
   program instructions to mask the presentation of the sensitive data according to the presentation status and the display coordinates.

9. The computer program product according to claim 8, wherein the participant's characteristics comprise participant work role.

10. The computer program product according to claim 8, the stored program instructions further comprising:
    program instructions to generate a decision tree for a communications channel according to a participant's behavior, wherein the decision tree comprises communications from each of a plurality of communications channels; and program instructions to generate the display matrix including display rules according to a participant's characteristics and the decision tree.

11. The computer program product according to claim 8, the stored program instructions further comprising program instructions to mask audio content associated with the sensitive data according to the presentation status.

12. The computer program product according to claim 8, wherein detecting sensitive information comprises scanning a file for keywords.

13. The computer program product according to claim 8, the stored program instructions further comprising:
program instructions to capture a recording of a presentation wherein the recorded presentation comprises presentation status metadata for a participant.

14. The computer program product according to claim 8, wherein the participant's characteristics comprise a past presentation status for sensitive information.

15. A computer system for selectively presenting information, the computer system comprising:
one or more computer processors;
one or more computer readable storage devices; and
stored program instructions on the one or more computer readable storage devices for execution by the one or more computer processors, the stored program instructions comprising:
program instructions to generate a dictionary, the dictionary comprising information categorized as sensitive using participant provided input, and viewing permission limits for the information according to a participant's characteristics including at least one participant characteristic selected from a group consisting of: name, company affiliation and job role;
program instructions to generate a display matrix including display rules according to the participant's characteristics;
program instructions to detect sensitive data in a presentation stream according to the dictionary;
program instructions to determine display coordinates for the sensitive data;
program instructions to determine a presentation status for the sensitive data according to the participant's characteristics, the dictionary, and the display matrix; and
program instructions to mask the presentation of the sensitive data according to the presentation status and the display coordinates.

16. The computer system according to claim 15, wherein the participant's characteristics comprise participant work role.

17. The computer system according to claim 15, program instructions to generate a decision tree for a communications channel according to a participant's behavior, wherein the decision tree comprises communications from each of a plurality of communications channels; and
program instructions to generate the display matrix including display rules according to a participant's characteristics and the decision tree.

18. The computer system according to claim 15, the stored program instructions further comprising program instructions to mask audio content associated with the sensitive data according to the presentation status.

19. The computer system according to claim 15, wherein detecting sensitive information comprises scanning a file for keywords.

20. The computer system according to claim 15, the stored program instructions further comprising:
program instructions to capture a recording of a presentation wherein the recorded presentation comprises presentation status metadata for a participant.

\* \* \* \* \*